United States Patent
Shah et al.

(10) Patent No.: US 11,886,369 B1
(45) Date of Patent: Jan. 30, 2024

(54) APPARATUS AND METHODS FOR BURST COMMUNICATIONS WITHIN DIE ARCHITECTURES

(71) Applicant: QUALCOMM Incorporated, San Diego, CA (US)

(72) Inventors: Parth Saurabhkumar Shah, Bangalore (IN); Imran Ghazi, Cambridge (GB); Philip Hardy, Cambridge (GB)

(73) Assignee: QUALCOMM Incorporated, San Diego, CA (US)

( * ) Notice: Subject to any disclaimer, the term of this patent is extended or adjusted under 35 U.S.C. 154(b) by 0 days.

(21) Appl. No.: 18/466,923

(22) Filed: Sep. 14, 2023

(51) Int. Cl.
*G06F 13/40* (2006.01)
*G06F 13/42* (2006.01)

(52) U.S. Cl.
CPC ...... *G06F 13/4027* (2013.01); *G06F 13/4282* (2013.01)

(58) Field of Classification Search
CPC .................. G06F 13/2027; G06F 13/4282
See application file for complete search history.

(56) References Cited

U.S. PATENT DOCUMENTS

| | | | |
|---|---|---|---|
| 6,415,348 B1 * | 7/2002 | Mergard ............. | G06F 13/4004 710/305 |
| 7,584,009 B2 * | 9/2009 | Andersen ............. | H03F 3/2171 700/94 |
| 7,725,621 B2 * | 5/2010 | Mutaguchi .............. | G06F 13/28 710/36 |
| 10,185,685 B2 * | 1/2019 | Baba ..................... | G06F 13/364 |
| 11,093,416 B1 * | 8/2021 | Dunning ............. | G06F 13/1668 |
| 11,757,995 B2 * | 9/2023 | Rizzo Piazza Roncoroni ............. | H04L 67/12 |
| 2007/0143512 A1 * | 6/2007 | Kuo .................... | G06F 13/4291 710/110 |
| 2009/0228631 A1 * | 9/2009 | Marulkar ............. | G06F 13/1605 711/E12.001 |
| 2009/0249089 A1 * | 10/2009 | Tremel .................. | G06F 1/3203 713/300 |
| 2013/0262786 A1 * | 10/2013 | Takashima .............. | G06F 12/00 711/147 |
| 2020/0341934 A1 * | 10/2020 | Abdul Kalam ..... | G06F 13/1673 |

* cited by examiner

*Primary Examiner* — Henry Tsai
*Assistant Examiner* — Christopher A Daley
(74) *Attorney, Agent, or Firm* — DUANE MORRIS LLP/QUALCOMM

(57) ABSTRACT

Methods and apparatuses directed to more efficient data transfers within die architectures. In some examples, a die package includes controller logic electrically coupled to a first communication bus and a second communication bus. The controller logic can receive an initial data transfer request over the first communication bus, and determine a final address of the initial data transfer request. Further, the controller logic can assert a chip select signal of the second communication bus to initiate a data exchange. While asserting the chip select signal, the controller logic can receive an additional data transfer request over the first communication bus, and determine an initial address of the additional data transfer request. Based on the determined initial and final addresses, the controller logic can initiate an additional data exchange over the second communication bus without de-asserting the chip select signal.

20 Claims, 8 Drawing Sheets

APPARATUS AND METHODS FOR BURST COMMUNICATIONS WITHIN DIE ARCHITECTURES

BACKGROUND

Field of the Disclosure

This disclosure relates generally to die architectures and, more particularly, to communication interfaces within die architectures.

Description of Related Art

In various applications, die architectures rely on communication interfaces and protocols for the exchange of data. For example, integrated circuits (ICs) may connect to each other using communication interfaces that allow for the transfer of data between the ICs using a particular protocol. These communication interfaces may include parallel or serial communication interfaces. For example, the serial peripheral interface (SPI) is one type of serial communication interface that is widely used within die architectural designs. For instance, a microcontroller that supports SPI may communicate over a SPI bus with another IC using a SPI protocol. The other IC may be a memory device, a sensor, or another processing device, among other examples. There are opportunities to improve communication interfaces, such as by increasing the efficiency and speed at which data is transferred when using corresponding protocols.

SUMMARY

According to an aspect, a device includes controller logic configured to receive a first data transfer request over a first communication bus. The controller logic is also configured to determine a final address based on the first data transfer request. Further, the controller logic is configured to assert a first chip select signal of a second communication bus in response to the first data transfer request. While asserting the first chip select signal, the controller logic is configured to: 1) initiate a first data exchange over the second communication bus; 2) receive a second data transfer request over the first communication bus; 3) determine an initial address based on the second data transfer request; 4) determine to continue to assert the first chip select signal based on the initial address and the final address; and 5) initiate a second data exchange over the second communication bus while the first chip select signal is asserted.

According to another aspect, a method by controller logic includes receiving a first data transfer request over a first communication bus. The method also includes determining a final address based on the first data transfer request. Further, the method includes asserting a first chip select signal of a second communication bus in response to the first data transfer request. While asserting the first chip select signal, the method includes: 1) initiating a first data exchange over the second communication bus; 2) receiving a second data transfer request over the first communication bus; 3) determining an initial address based on the second data transfer request; 4) determining to continue to assert the first chip select signal based on the initial address and the final address; and 5) initiating a second data exchange over the second communication bus while the first chip select signal is asserted.

According to yet another aspect, a non-transitory, machine-readable storage medium comprises instructions that, when executed by at least one processor, cause the at least one processor to perform operations. The operations include receiving a first data transfer request over a first communication bus. The operations also include determining a final address based on the first data transfer request. Further, the operations include asserting a first chip select signal of a second communication bus in response to the first data transfer request. While asserting the first chip select signal, the operations include: 1) initiating a first data exchange over the second communication bus; 2) receiving a second data transfer request over the first communication bus; 3) determining an initial address based on the second data transfer request; 4) determining to continue to assert the first chip select signal based on the initial address and the final address; and 5) initiating a second data exchange over the second communication bus while the first chip select signal is asserted.

According to even another aspect, a die package includes a processor electrically coupled to controller logic over a first communication bus. The controller logic is configured to receive a first data transfer request from the processor over the first communication bus. The controller logic is also configured to determine a final address based on the first data transfer request. Further, the controller logic is configured to assert a first chip select signal of a second communication bus in response to the first data transfer request. While asserting the first chip select signal, the controller logic is configured to: 1) initiate a first data exchange over the second communication bus; 2) receive a second data transfer request from the processor over the first communication bus; 3) determine an initial address based on the second data transfer request; 4) determine to continue to assert the first chip select signal based on the initial address and the final address; and 5) initiate a second data exchange over the second communication bus while the first chip select signal is asserted.

DETAILED DESCRIPTION

Figure 1:
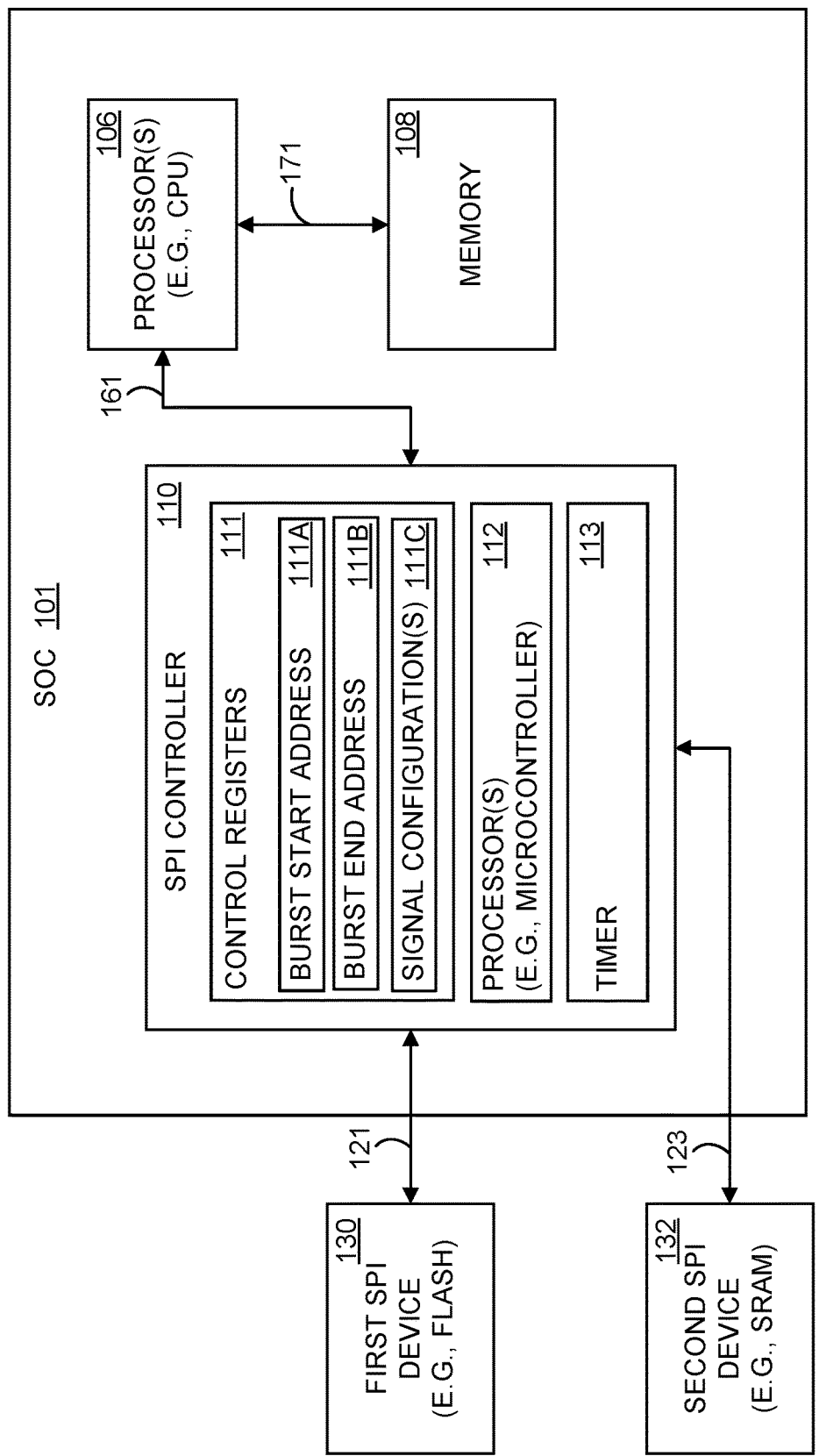
FIG. 1 is a block diagram of an integrated circuit, according to some implementations.

While the features, methods, devices, and systems described herein may be embodied in various forms, some exemplary and non-limiting embodiments are shown in the drawings, and are described below. Some of the components described in this disclosure are optional, and some implementations may include additional, different, or fewer components from those expressly described in this disclosure.

The embodiments described herein are directed to communication interfaces within die architectures that allow for more efficient data transfers, such as burst data transfers. For instance, to conduct some serial peripheral interface (SPI) data transfers, a SPI controller receives a first command to, for example, read an amount of data from an address of a SPI device (e.g., a beginning address of a memory location to read). In response, the SPI controller asserts a chip select signal to the SPI device, generates a clock signal to the SPI device, and transmits, to the SPI device, a read command followed by the address and, in some instances, "dummy" data. The SPI controller may then receive the read data in subsequent clock cycles, and de-asserts the chip select signal. If burst mode is supported, the SPI controller may assert the chip select signal up until to a maximum amount of data (e.g., a maximum number of bytes) has been read out (e.g., 64 bytes, 256 bytes, etc.) before de-asserting the chip select signal.

If the SPI controller receives a second command to read additional data from a second address, the SPI controller repeats the above process. For instance, the SPI controller re-asserts the chip select signal to the SPI device, generates the clock signal to the SPI device, and transmits, to the SPI device, a second read command followed by the second address and, in some instances, additional "dummy" data. The SPI controller may then receive the additional data in subsequent clock cycles, and then de-asserts the chip select signal. As such, for each read command received, the SPI controller follows the above described process.

Figure 3:
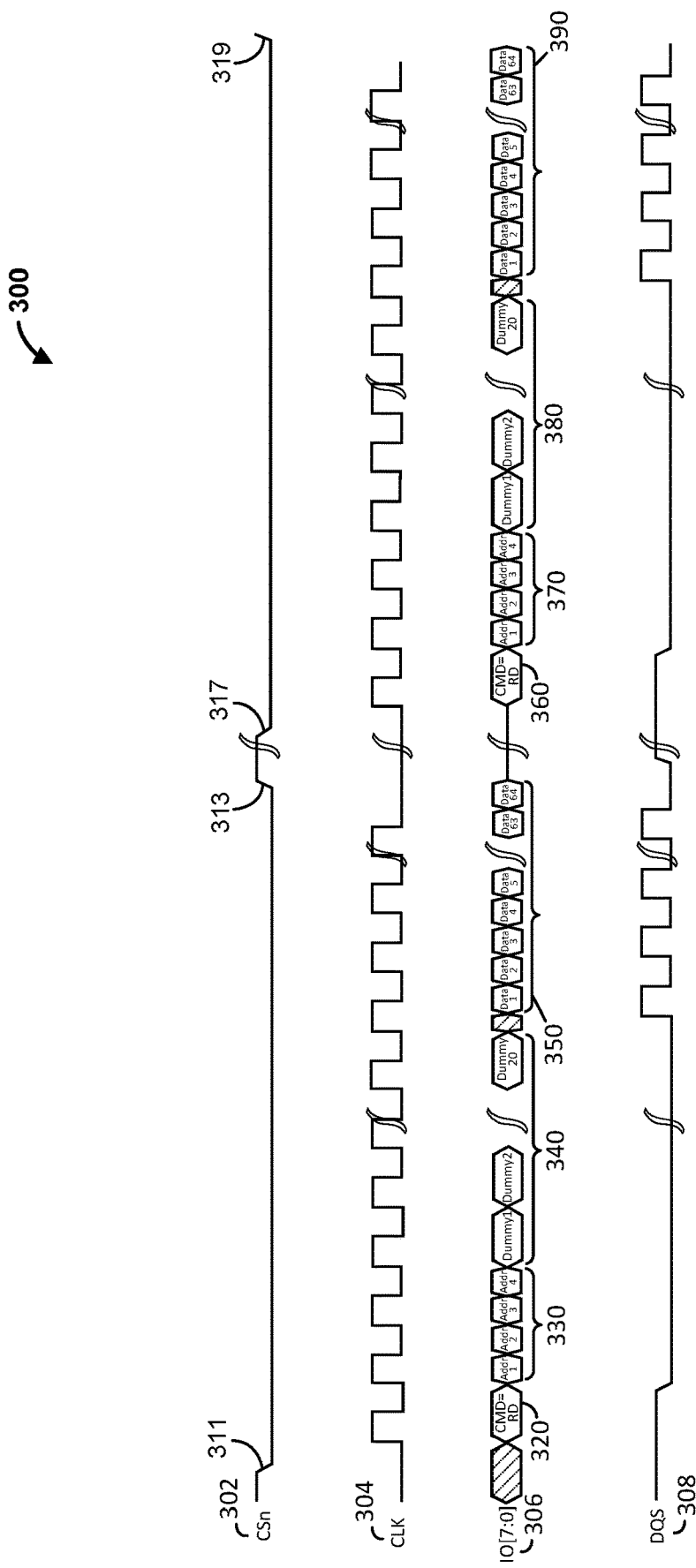
FIG. 3 is a signal sequence diagram of a communication bus.

For example, FIG. 3 illustrates an SPI interface 300 that includes a chip select (CS) signal 302, a clock (CLK) signal 304, a plurality of input/output (I/O) signals 306, and a data strobe (DQS) signal 308. The SPI interface 300 may connect an SPI controller with another SPI device (e.g., SPI slave device), for example. The example assumes that the CS signal 302 is active low, i.e., the CS signal is asserted when transitioning from a higher voltage (e.g., 3.3 Volts) to a lower voltage (e.g., 0 Volts).

As illustrated, after a first assertion 311 of the CS signal 302, the CLK signal 304 begins clocking (e.g., transitioning from one state to another) at a frequency. Further, the plurality of IO signals 306 (eight I/O signals in this example) provide a first READ command 320, followed by four address bytes 330 (each address byte 330 clocked on alternating rising and falling edges of the CLK signal 304), and twenty fields of dummy data 340. Following dummy data 340, sixty-four bytes of data 350 are clocked out beginning from an address location of the SPI device defined by the address bytes 330, and ending at an address holding the sixty-fourth byte. After the last data byte 350 is clocked out, the CS signal 302 is de-asserted 313.

To clock out another sixty-four bytes of data, such as sixty-four bytes of data that are located in memory locations that begin at a memory location following the memory location from which the last byte of data was read from, a second assertion 317 of the CS signal 302 is required. As illustrated, after the second assertion 317 of the CS signal 302, the CLK signal 304 begins clocking, and the plurality of I/O signals 306 provide a second READ command 360. Following the second READ command 360, four address bytes 370 followed by a second set of twenty fields of dummy data 380 are clocked out. Following the second set of dummy data 380, a second set of sixty-four bytes of data 390 are clocked out beginning from an address location of the SPI device defined by the four address bytes 370. After the last data byte 390 is clocked out, the CS signal 302 is de-asserted 319 a second time.

In contrast to these data transfer methods, the embodiments described herein can provide more efficient data transfers, such as more efficient data transfers of the first set of sixty-four bytes of data 350 and the second set of sixty-four bytes of data 390. The embodiments may eliminate, for instance, the need to provide the second READ command 360, the second set of four address bytes 370, and the second set of dummy data 380 to obtain the second set of sixty-four bytes of data 390.

For instance, FIG. 1 illustrates an integrated circuit package 100 that includes a System-on-a-Chip (SoC) 100 electrically connected to a first SPI device 130 and a second SPI device 132. The SoC 100 may include an SPI controller 110 (e.g., SPI master) communicatively coupled over a communication bus 161 to one or more processors 106. Communication bus 161 may be, for example, an advanced high performance bus (AHB) or advanced extensible interface (AXI). In addition, each of the processors 106 are communicatively coupled to a memory 108 over communication bus 171. Each processor 106 may be, for example, a graphical processing unit (GPU), a central processing unit (CPU), a microcontroller, or any other suitable processing device. The memory 108 may be, for example, a RAM device (e.g., SRAM device), a FLASH device, or any other suitable memory device. For instance, processor 106 may be operable to execute instructions stored in memory 108, or may be able to store and fetch data.

Further, each of the first SPI device 130 and the second SPI device (e.g., SPI slave devices) may be any device configured to communicate over an SPI bus, such as a FLASH device, a processing device such as a CPU or GPU, a sensor, or any other suitable device. The SPI controller 110 of the SoC 101 can communicate with each of the first SPI device 130 and the second SPI device 132 over SPI communication buses 121, 123, respectively. For example, each of the SPI communication buses 121, 123 may include respective chip select lines, as well as a clock line, a data strobe line, and input/output (I/O) lines (e.g., one, two, four, eight, sixteen I/O lines).

Figure 2:
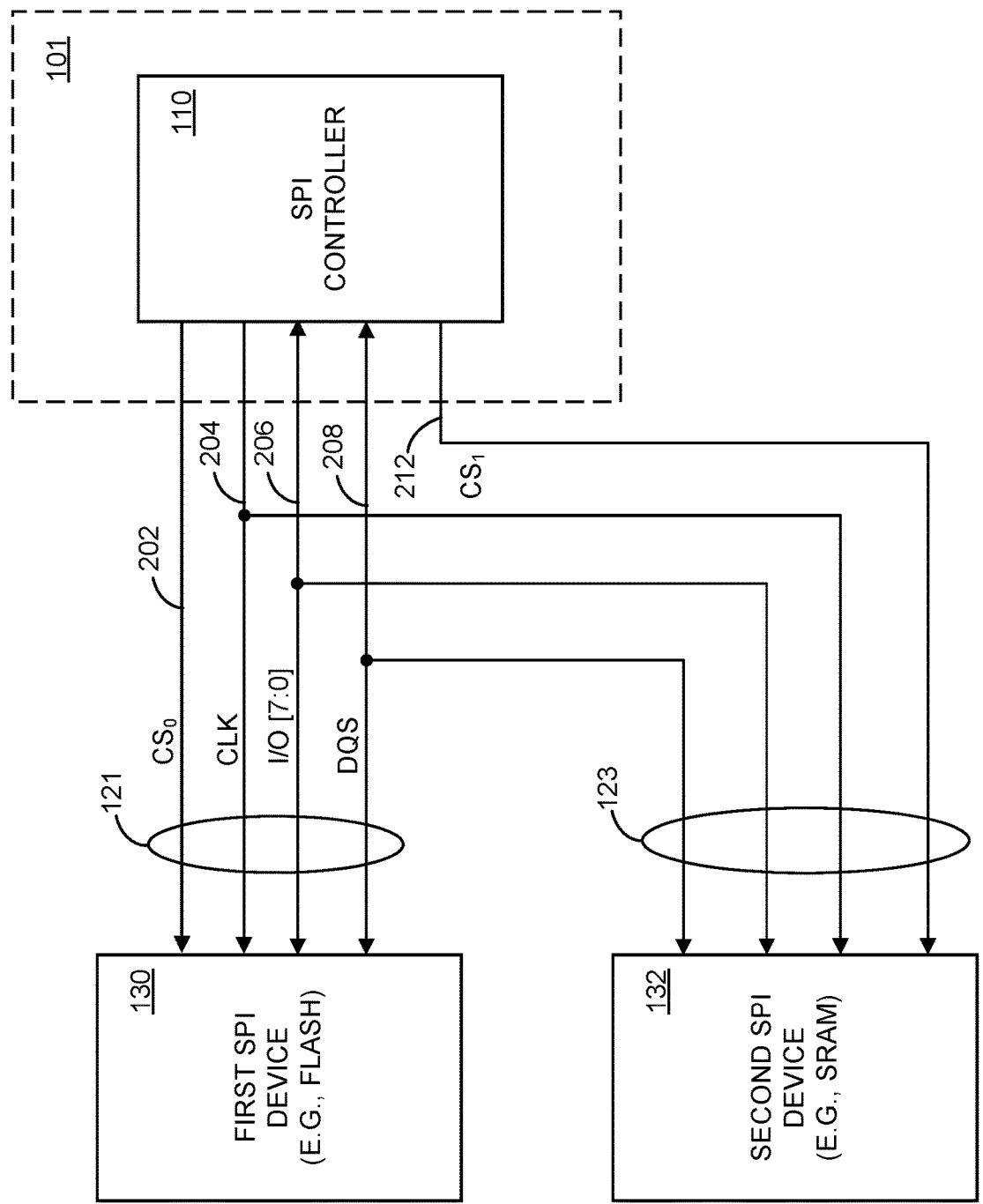
FIG. 2 is a block diagram illustrating portions of an integrated circuit, according to some implementations.

FIG. 2, for instance, illustrates examples of SPI communication busses 121, 123. As illustrated, each of the SPI communication busses 121, 123 share a clock (CLK) line 204, eight I/O lines 206, and a data strobe (DQS) line 208. Further, each of the CLK line 204, I/O lines 206, and DQS line 208 electrically connect the SPI controller 110 to each of the first SPI device 130 and the second SPI device 132. In addition, SPI communication buss 121 includes a first chip select (CS) line 202, and SPI communication buss 123 includes a second CS line 212. The first CS line 202 electrically connects the SPI controller 110 to the first SPI device 130, and the second CS line 212 electrically connects the SPI controller 110 to the second SPI device 132. In this example, SPI controller 110 may be a SPI master, and each of the first SPI device 130 and the second SPI device 132 may be SPI slaves.

The SPI controller 110 is configured to provide a clock signal on the CLK line 204, and to receive an optional data strobe signal (e.g., provided by a slave SPI device, such as first SPI device 120) on the DQS line 208, which is aligned with data on the I/O lines 206. Further, the SPI controller 110 is configured to provide a first CS signal on the first CS line 202. For instance, the SPI controller 110 may assert, and de-assert, the first CS signal on the first CS line 202 to select and deselect, respectively, the first SPI device 130. Similarly, the SPI controller 110 is configured to provide a second CS signal on the second CS line 212. For instance, the SPI controller 110 may assert, and de-assert, the second CS signal on the second CS line 212 to select and deselect, respectively, the second SPI device 132. Further, the SPI controller 110 may provide, and receive, data on the I/O lines 206, in accordance with SPI protocols, for instance.

Referring back to FIG. 1, SPI controller 110 includes control registers 111, one or more SPI processors 112, and a timer 113. Each SPI processor 112 may be any suitable processing device, such as a CPU, GPU, or microcontroller. Moreover, control registers 111 (e.g., SRAM registers, NVRAM registers, FLASH registers, etc.) include a burst start address register 111A, a burst end address register 111B, and one or more signal configuration registers 111C. The signal configuration registers 111C define a configuration of the SPI communication bus 121, 123. Processor 106 may write to the signal configuration registers 111C to configure one or more of the SPI communication buses 121, 123. For instance, the signal configuration registers 111C may define a frequency, phase, and polarity of the clock signal of the SPI communication buses 121, 123, as well as a baud rate for data transfers. The signal configuration registers 111C may also define a status of the SPI communication buses 121, 123, and may allow for a selection of a chip select signal (e.g., the chips select signal to any of the SPI communication buses 121, 123, among other configuration settings of the SPI communication buses 121, 123.

In addition, the burst start address register 111A defines a start address of a requested data exchange (e.g., received over communication bus 161), and the burst end address registers 111B defines an end address of the requested data exchange. Although one set of control registers 111 is illustrated merely for simplicity, in some examples, SPI controller 110 includes a set of control registers 111 for each SPI bus, such as each of SPI communication buses 121, 123.

For example, processor 106 may provide signaling over communication bus 161 that characterizes a data transfer request, such as a data read request, to SPI controller 110. The data read request is a request for data to be read from first SPI device 130. The data read request may be based, for instance, on the AHB or AXI protocol. The data read request may identify an address of data to be read (e.g., an relative address mapped to the first SPI device 130). SPI processor 112 of SPI controller 110 may determine a start address from the data read request (e.g., the first address received for this data transfer request, the address of the first data byte to be read), and may write the start address to burst start address register 111A. In addition, SPI processor 112 may determine an end address based on a last address received in the data read request. For example, as described herein, the end address may be the last address received for the data read request.

In some examples, SPI processor 112 may determine the end address based on the start address and a number of bytes identified in the data read request. For example, the data read request may identify the number of bytes to be read (or written). The SPI processor 112 may determine the number of bytes to read from the data read request, and may add the number of bytes to the start address to determine the end address. In some examples, SPI processor 112 may divide the number of bytes by a factor, such as four, to determine a number of address locations, and may add the number of address locations to the start address to determine the end address. SPI processor 112 may write the end address to the burst end address register 111B.

Further, to initiate the data reads from the first SPI device 130, SPI controller 110 may assert the chip select signal of SPI communication bus 121, and may begin providing a clock over the clock signal (e.g., at the configured frequency). The SPI controller 110 may then initiate a transfer of data with the first SPI device 130. For instance, the SPI controller 110 may provide a READ command over the I/O lines of the SPI communication bus 121, followed by a corresponding SPI start address. The SPI start address may be based on the first address received in the data read request. In some examples, dummy data follows the SPI start address. For example, dummy data may follow an SPI start address to allow a slave device, such as first SPI device 130 and second SPI device 132, enough time to access memory and have data ready to be clocked out. The SPI controller 110 may then receive, from the first SPI device 130 and over the I/O lines, the amount of data requested. For instance, as the SPI controller 110 continues to provide the clock over the clock signal for the requested amount of data, the first SPI device 130 begins providing, over the I/O lines, data beginning from a memory location mapped to the SPI start address until the amount of data is clocked out, completing a first data transfer for the amount of data requested.

Once the last data (e.g., last data byte, last data word, etc.) is received, the SPI controller 110 stops providing the clock over the clock signal, but maintains the chip select signal asserted. In other words, although the data transfer is complete, the SPI controller 110 nonetheless maintains the chip select signal to the first SPI device 130 asserted.

The SPI controller 110 may then receive an additional data transfer request, such as an additional data read request, from processor 106 over communication bus 161. The additional data read request may be a request for additional data to be read from the first SPI device 130. The additional data read request may identify an additional start address (e.g., the address from where to read or begin reading), and in some examples an additional amount of data to be read. SPI processor 112 of SPI controller 110 may then determine the additional start address from the additional data read request as described herein. Further, SPI processor 112 may determine whether the additional start address continuously follows after the end address stored in the burst end address register 111B. For instance, SPI processor 112 may determine whether the additional start address is a predetermined amount (e.g., one) greater than the end address stored in the burst end address register 111B. The predetermined amount may be any value characterizing consecutive memory locations storing the data requested from first SPI device 130. For instance, the predetermined amount may be one, two, four, eight, or any other suitable value.

Figure 7B:
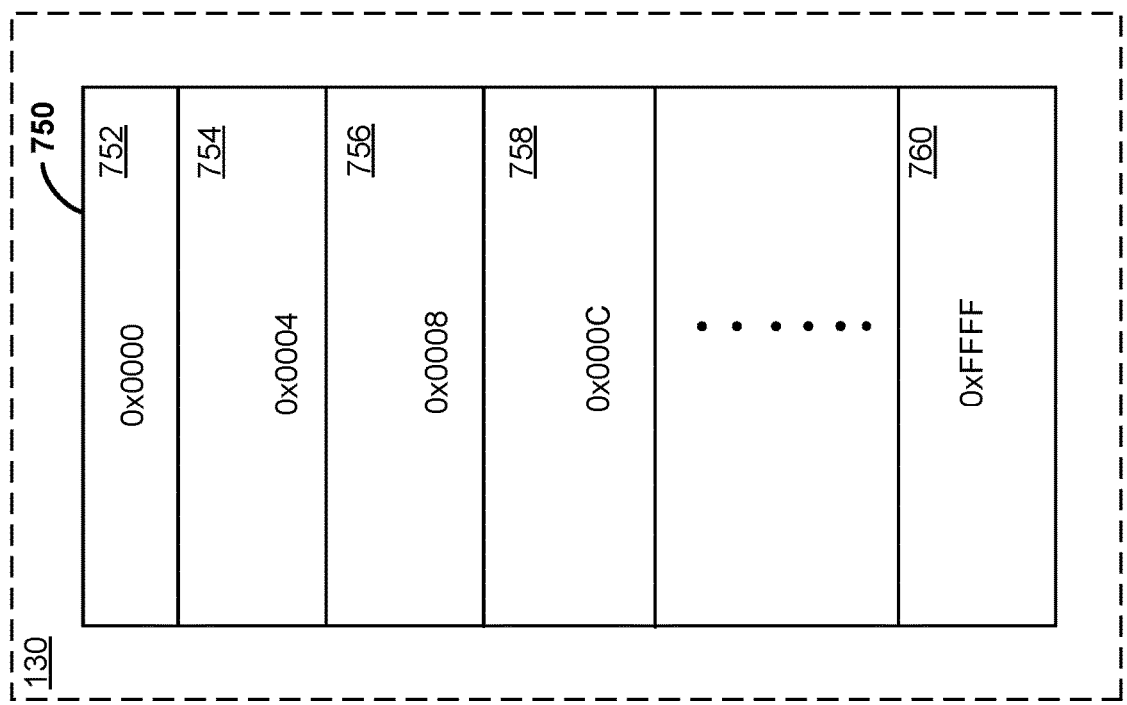
FIGS. 7A and 7B illustrate memory configurations of memory devices, according to some implementations.
Figure 7A:
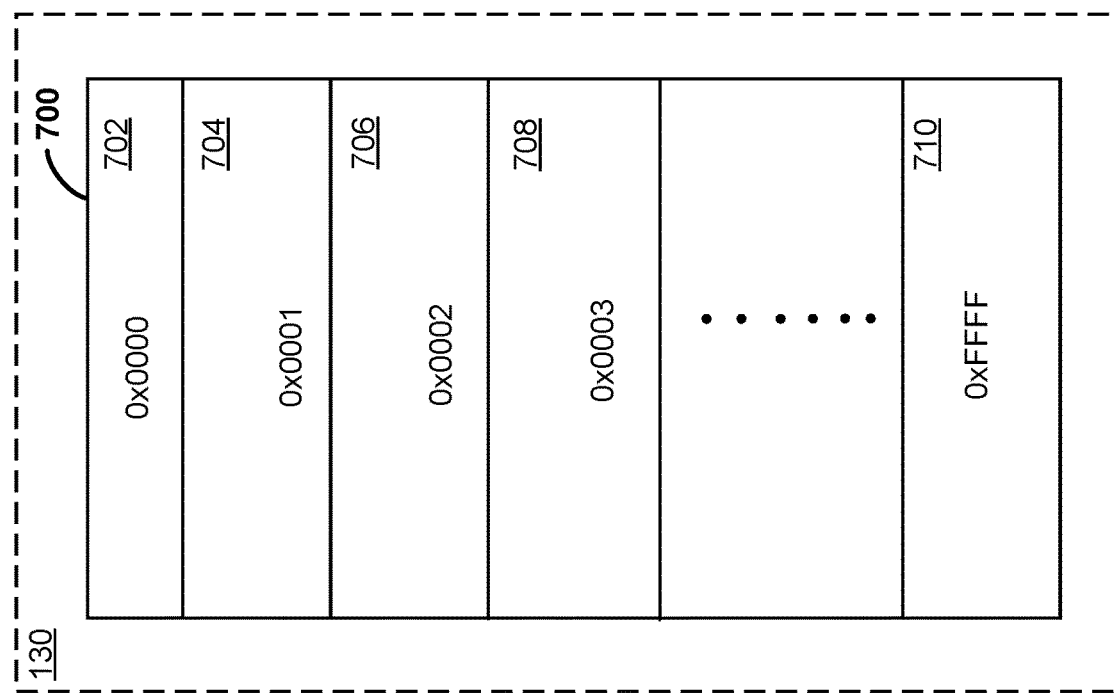

As an example, FIGS. 7A and 7B illustrate corresponding memory devices with consecutive memory locations in various configurations. FIG. 7A illustrates a memory device 700 within first SPI device 130 that includes various memory locations including first memory location 702, second memory location 704, third memory location 706, fourth memory location 708, and fifth memory location 710. In this example, consecutive memory locations are offset by an amount of one. For example, the first memory location 702, is located at address and the second memory location 704 is located at address 0x0001. The second memory location 704 consecutively follows (i.e., continuously follows) from the first memory location 702 (e.g., by one, as 0x0001−0x0000=1). Similarly, the third memory location 706 consecutively follows from the second memory location 704, and the fourth memory location 708 consecutively follows from the third memory location 706. In this example, as illustrated, the fifth memory location 710 does not follow consecutively from the fourth memory location 708, as additional memory locations are located (e.g., mapped to addresses) between the fourth memory location 708 and the fifth memory location 710.

FIG. 7B, however, illustrates a memory device 750 with consecutive memory locations that are offset by an amount of four. For example, memory device 750 includes a first memory location 752, a second memory location 754, a third memory location 756, a fourth memory location 758, and a fifth memory location 760. The first memory location 752 is located at address 0x0000, and the second memory location 704 is located at address 0x0004. The second memory location 754 consecutively follows (i.e., continuously follows) from the first memory location 752 (e.g., by four, as 0x0004−0x0000=4). Similarly, the third memory location 756 consecutively follows from the second memory location 754, and the fourth memory location 758 consecutively follows from the third memory location 756. In this example, as illustrated, the fifth memory location 760 does not follow consecutively from the fourth memory location 758, as additional memory locations are located (e.g., mapped to addresses) between the fourth memory location 758 and the fifth memory location 760.

Referring back to FIG. 1, if the additional start address received in the additional data transfer request is equal to the addition of the predetermined amount and the end address stored in the burst end address register 111B, the SPI controller 110 may begin a second data transfer for the additional amount of data requested. In this instance, the SPI controller 110 begins providing the clock over the clock signal, and begins receiving the additional data from the first SPI device 130 over the I/O lines of the SPI communication bus 121. The additional data is received from the first SPI device 130 without a need for the SPI controller to provide an additional READ command or the additional start address. The SPI controller 110 may also write the additional start address to the burst start address register 111A, and further determine an additional end address as described herein, and write the additional end address to the burst end address register 111B.

If, however, the additional start address does not continuously follow from the end address stored in the burst end address register 111B (e.g., the additional start address is not equal to the addition of the predetermined amount and the end address stored in the burst end address register 111B), the SPI controller 110 may de-assert the chip select signal to the first SPI device 130. The SPI controller 110 may then re-assert the chip select signal (e.g., after a predetermined minimum amount of time) to carry out another full SPI data transfer. For example, the SPI controller 110 may begin providing the clock over the clock signal, and may provide an additional READ command over the I/O lines of the SPI communication bus 121, followed by the requested additional start address. In some examples, dummy data follows the additional start address. The SPI controller 110 may then receive, from the first SPI device 130 and over the I/O lines, the amount of data requested for the additional data. For instance, as the SPI controller 110 continues to provide the clock over the clock signal, the first SPI device 130 begins providing, over the I/O lines, the additional data beginning from a memory location mapped to the additional start address, until the additional amount of data is clocked out. Once the last data (e.g., last data byte, last data word, etc.) is received, the SPI controller 110 stops providing the clock over the clock signal to complete the second data transfer. The SPI controller 10 may then de-assert the chip select signal if an address for a third data transfer is determined to be non-continuous, or if a request for a third data transfer is not received within a predetermined amount of time, as described herein.

The above process may then repeat for additional data transfer requests, such as additional data read requests, received from processor 106. Although the above process is described with respect to reading data from SPI devices, such as the first SPI device 130, the above process can also be applied for other types of data transfers, such as data write requests. For example, rather than the SPI controller 110 reading data from the first SPI device 130 over the I/O lines as described above, the SPI controller 110 would write data to the first SPI device 130 over the I/O lines in accordance with the SPI protocol.

In some examples, SPI controller 110 may de-assert a chip select signal if a predetermined amount of time has passed since an initial data transfer has begun. For example, in response to receiving an initial data transfer request (e.g., read request) for first SPI device 130, SPI processor 112 may configure (e.g., write to) timer 113 with a value characterizing a predetermined amount of time, such as 10 microseconds. In some examples, the predetermined amount of time corresponds to a number of clock cycles of an internal bus of SoC 101. In some instances, the value is based on a speed at which a consumer is likely to request the next consecutive address and the power costs of the slave device resulting from keeping its chip request asserted. SPI processor 112 may then start the timer 113. The timer 113 may expire at the end of the predetermined amount of time, thereby generating a timer signal (e.g., a timer interrupt) within SPI controller 110. SPI controller 110 may process the initial data transfer request as described herein. After completing the initial data transfer request and while maintaining the chip select signal to first SPI device 130, should the timer 113 expire (or already be expired), the SPI controller 110 is configured to de-assert the chip select signal to the first SPI device 130. In some examples, in response to the timer 113 expiring, the SPI controller 110 resets the burst start address register 111A and/or the burst end address register 111B by writing data (e.g., all ones or zeros) to each register. In some examples, and in response to the timer 113 expiring, the SPI controller 110 resets a designated "valid bit" of the burst start address register 111A and/or the burst end address register 111B. Should the SPI controller 110 then receive another data transfer request (e.g., read or write data transfer request) from processor 106, the SPI controller 110 initiates a full SPI transfer for the requested data. In other words, the SPI controller 110 initiates the chip select signal to the requested device, such as the first SPI device 130 or the second SPI device 132, provides a command, such as a READ command or WRITE command, over the I/O lines, followed by a start address and, in some examples, dummy data. The data transfer to the processor 106 then completes as described herein, and the chip select signal to the device is maintained asserted as described herein. SPI processor 112 may reset the timer 113 upon receiving each data transfer request from processor 106.

Figure 4A:
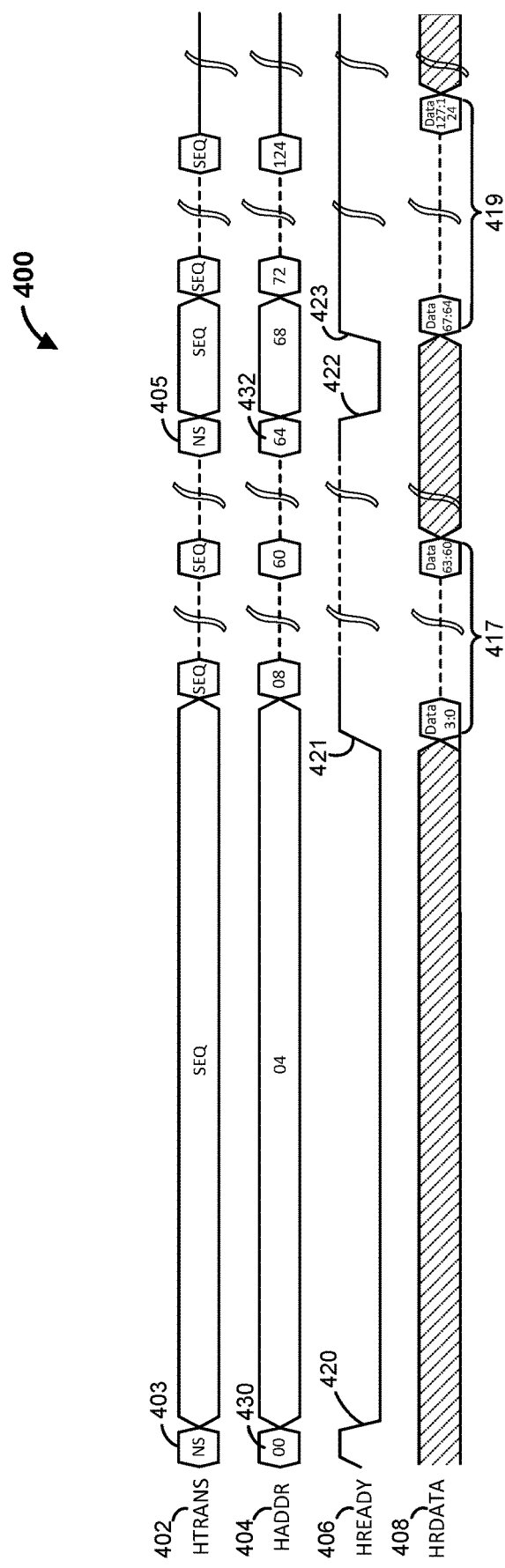
FIGS. 4A and 4B illustrate signal sequence diagrams, according to some implementations.

FIG. 4A illustrates an example of communication signals 400 that can be provided in at least some examples of communication bus 161 connecting the SPI controller 110 to processor 106. In this example, communication bus 161 is an advanced high performance bus (AHB). As illustrated, communication signals 400 may include an HTRANS signal 402, an HADDR signal 404, an HREADY signal 406, and an HRDATA signal 408. As known for the AHB protocol, the HTRANS signal 402 indicates a transfer type, the HREADY signal 406 indicates the initiation of a data transfer, the HADDR signal 404 defines a system address, and the HRDATA signal 408 defines the transferred data (e.g., for reads and writes). Communication bus 161 may include additional, or alternate, AHB signals.

Figure 4B:
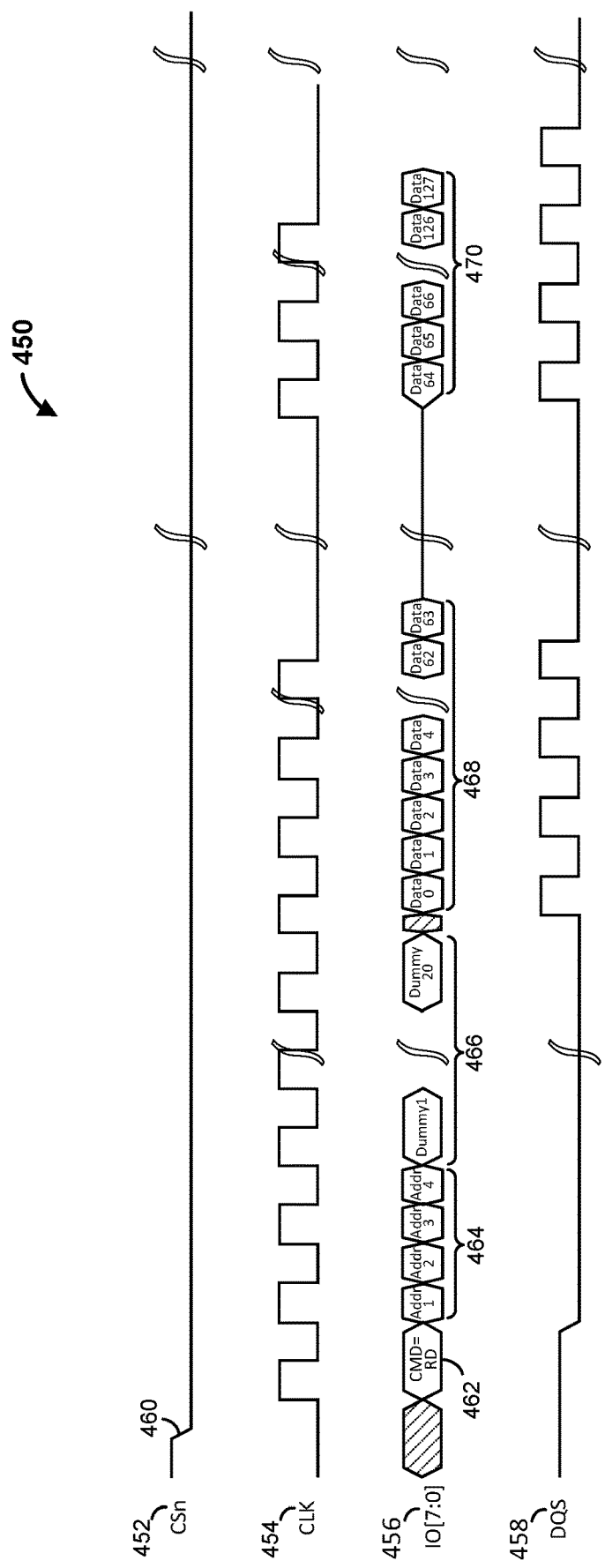

FIG. 4B illustrates an example of communication signals 450 that can be provided in at least some examples of each of the SPI communication buses 121, 123 connecting the SPI controller 110 to the first SPI device 130 and the second SPI device 132, respectively. As illustrated, communication signals 450 include a chip select (CS) signal 452 (e.g., which can be provided on a corresponding CS line 202, 212), and clock (CLK) signal 454 (e.g., which can be provided on the CLK line 204). Communication signals 450 also include I/O signals 456 (e.g., which can be provided on I/O lines 206), and a data strobe (DQS) signal 458 (e.g., which can be provided on DQS line 208).

When the SPI controller 110 receives a data transfer request on the communication bus 161, the SPI controller 110 initiates a data transfer on one of the SPI communication buses 121, 123 based on the HADDR signal 404. For instance, the first SPI device 130, which is connected to the SPI communication bus 121, may be mapped to a first SPI address, and the first SPI device 130, which is connected to the SPI communication bus 123, may be mapped to a second SPI address. When a data transfer request is received from processor 106 on communication bus 161, the SPI controller 110 may determine a requested address from the HADDR signal 404, and may determine whether the requested address maps to the first SPI address or the second SPI address. Based on which of the first SPI address and the second SPI address the requested address maps to, the SPI controller 110 initiates a SPI data transaction on the corresponding SPI communication bus 121, 123.

For instance, and with reference to FIG. 4A, a first non-sequential (NS) value 403 of the HTRANS signal 402 indicates an initiation of a first read request, and a second NS value 405 of the HTRANS signal 402 indicates an initiation of a second read request. A first falling edge 420 of the HREADY signal 406 may follow the first NS value 403, and a second falling edge 422 of the HREADY signal 406 may follow the second NS value 405, each indicating to delay the data transfer across the HRDATA signal 408. When the SPI controller 110 detects the first falling edge 420 of the HREADY signal 406, the SPI controller 110 initiates a first SPI read request on the corresponding SPI communication bus 121, 123 based on a first starting address 430 provided on the HADDR signal 404 (e.g., address zero in this example). For instance, as illustrated in FIG. 4B, to initiate the first SPI read request the SPI controller 110 asserts the CS signal 452, as indicated by the falling edge 460 of the CS signal 452, and provides the clock signal 454 (e.g., at a configured frequency). Further, the SPI controller 110 provides, on the I/O signals 456, a READ command 462, followed by a starting address 464 (e.g., that maps to the first starting address 430) and, in this example, dummy data 466. Following the dummy data 466, the SPI controller 110 receives a first burst of data 468 which, in this example, corresponds to sixty-four bytes of data. The first burst of data 468 is aligned to pulses of the DQS signal 458 provided by the SPI controller 110. As illustrated in FIG. 4A, when the HREADY signal 406 is set high 421 (e.g., rising edge 421 of the HREADY signal 406), the SPI controller 110 begins to provide the sixty-four bytes of data to processor 106 over the HRDATA signal 408 as a first transfer of data 417.

Further, and as described herein, the SPI controller 110 may store the first starting address 430 within the burst start address register 111A. The SPI controller 110 may also determine the first ending address for the first bust of data 468, and may store the first ending address in the burst end address register 111B. In this example, the first ending address is sixty-three.

After the first burst of data 468 is clocked in by the SPI controller 110, the SPI controller 110 maintains the CS signal 452 asserted and, in some examples, stops providing the clock signal 454 (e.g., a clock signal that transitions between states), as illustrated in FIG. 4B. Referring back to FIG. 4A, the SPI controller 110, at some point in time after clocking in the first burst of data 468, detects the second falling edge 422 of the HREADY signal 406 indicating data is ready for the second read request from processor 106. Based on detecting the second falling edge 422 of the HREADY signal 406, the SPI controller 110 begins to initiate a second SPI read request on the corresponding SPI communication bus 121, 123.

For instance, the SPI controller 110 may determine a second starting address 432 for the second read request based on the HADDR signal 404 corresponding to the falling edge 422 of the HREADY signal 406. In this example, the second starting address 432 is sixty-four. Further, the SPI controller 110 may determine whether the second starting address 432 continuously follows from the first ending address stored in the burst end address register 111B. In this example, the second starting address 432 of sixty-four continuously follows from the first ending address of sixty-three. Although in this example continuous addresses are offset by one, in other examples, continuous address can be offset by another value, such as two, four, or eight, as described herein.

Based on determining that the second starting address 432 of sixty-four continuously follows from the first ending address of sixty-three, the SPI controller 110 begins to clock in additional data over the I/O signals 456. For instance, as illustrated in FIG. 4B, the SPI controller 110 begins to provide the clock signal 454 as well as the DQS signal 458 to clock in a second burst of data 470. In this example, the second burst of data 470 includes sixty-four bytes of data. As illustrated in FIG. 4A, when the HREADY signal 406 is set high 423 (e.g., rising edge 423 of the HREADY signal 406), the SPI controller 110 provides the sixty-four bytes of data to processor 106 over the HRDATA signal 408 as a second transfer of data 419.

Figure 5:
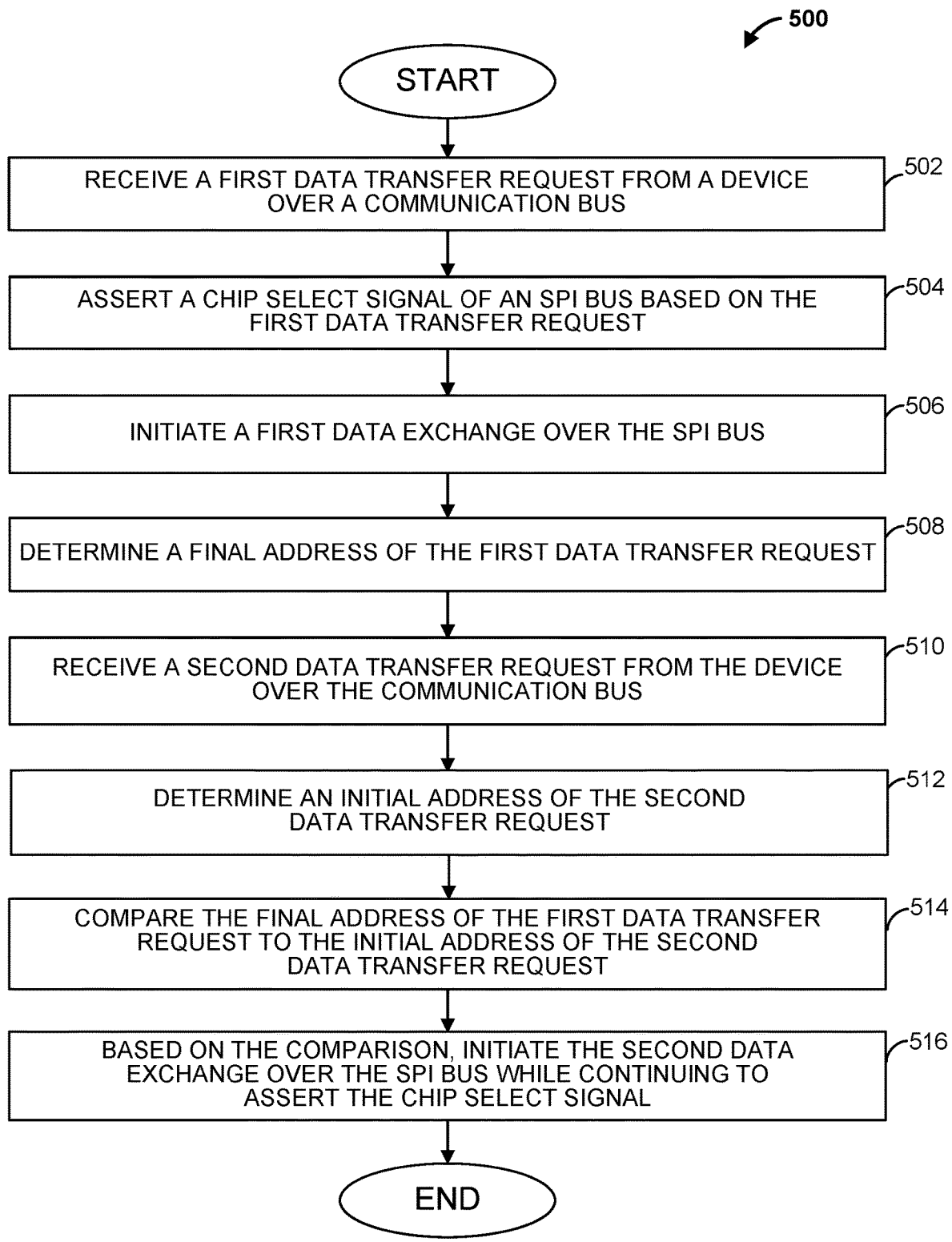
FIG. 5 is a flowchart of an exemplary process for providing burst transfers over a communication interface, according to some implementations.

FIG. 5 is a flowchart of an exemplary process 500 for providing burst transfers over a communication interface, in accordance with some exemplary embodiments. For example, one or more die packages, such as integrated circuit package 100, may perform one or more of the operations of exemplary process 500.

Referring to FIG. 5, at block 502, a first data transfer request is received from a device over a communication bus. For instance, SPI controller 110 may receive, over communication bus 161, a first data transfer request from processor 106. At block 504, a chip select of an SPI bus is asserted based on the first data transfer request. As an example, as described herein, SPI controller 110 may assert a chip select signal of SPI communication bus 121 based on the data transfer request received from processor 106.

Further, at block 506, a first data exchange is initiated over the SPI bus. For instance, the first data transfer request may be a read request. The SPI controller 110 may provide a READ command 462, followed by a number of address bytes 464 mapped to an address specified by the first data transfer request, and a number of fields of dummy data 466 over the I/O lines 206 of the SPI communication bus 121.

Following the dummy data 466, a first burst of data 468 is clocked out and received over the I/O lines 206.

Proceeding to block 508, a final address of the first data transfer request is determined. For instance, SPI controller 110 may determine the final address of the first data transfer request based on the final address indicated in the HADDR signal 404 of the communication bus 161 for the first data transfer request. In some examples, as described herein, the SPI controller 110 may store the final address in the burst end address register 111B.

Additionally, at block 510, a second data transfer request is received from the device over the communication bus. For instance, the SPI controller 110 may receive an additional data transfer request from processor 106. Further, at block 512, an initial address of the second data transfer request is determined. As an example, the SPI controller 110 may determine the initial address of the second data transfer based on the first address indicated in the HADDR signal 404 of the communication bus 161 for the second data transfer request. In some examples, the SPI controller writes the initial address to the burst start address register 111A.

At block 514, the final address of the first data transfer request is compared to the initial address of the second data transfer request. For example, as described herein, SPI controller 110 may compare the final address of the first data transfer request with the initial address of the second data transfer request to determine that the initial address continuously follows from the final address.

Further, at block 516, based on the comparison performed at block 514 and while continuing to assert the chip select signal, the second data exchange is initiated over the SPI bus. For example, as described herein, the second data transfer request may be another read request, and SPI controller 110 may receive data from the first SPI device 130 over the SPI communication bus 121. For instance, the SPI controller 110 may clock out a second burst of data 470 over the I/O lines 206 of the SPI communication bus 121.

Figure 6:
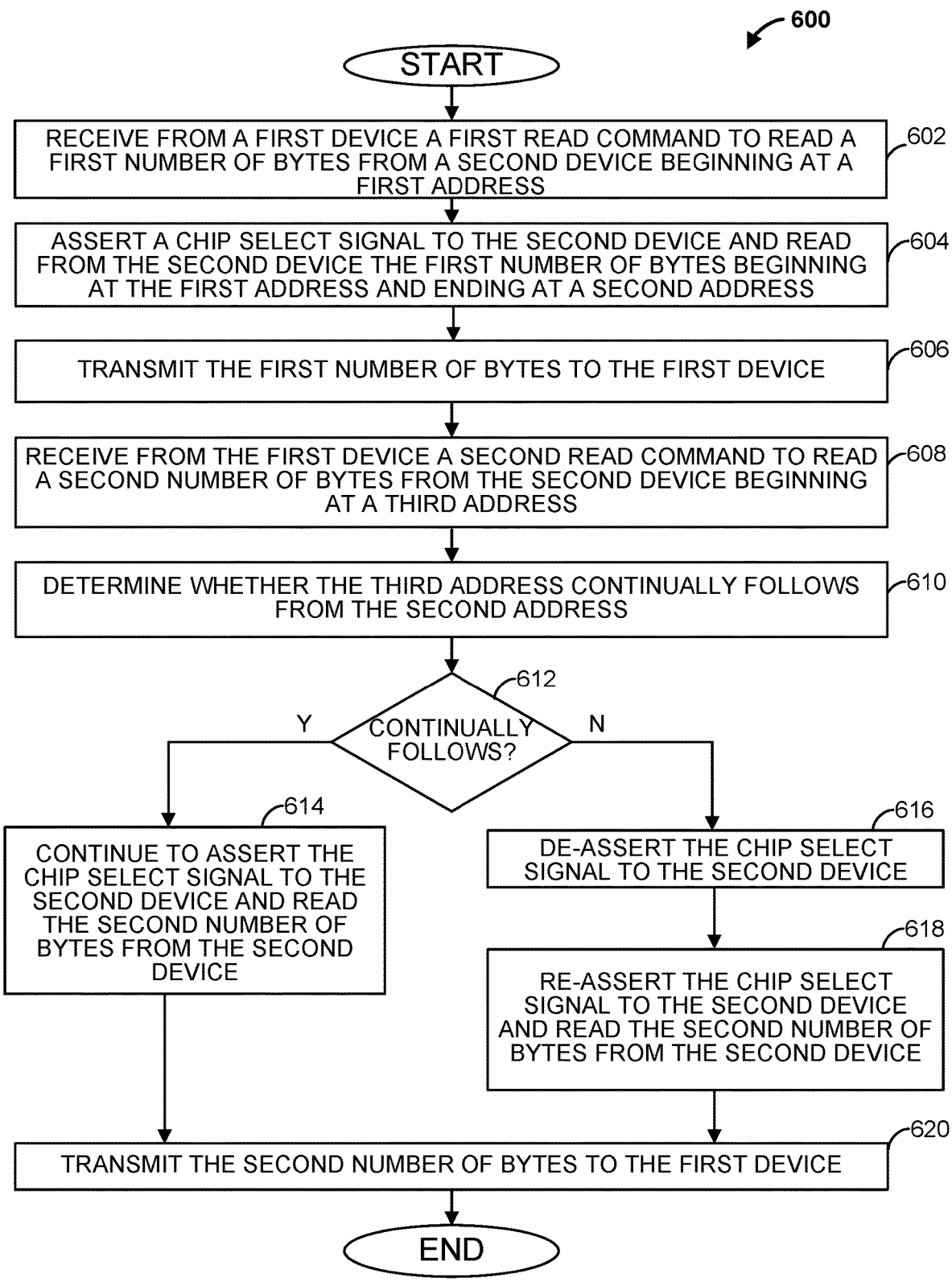
FIG. 6 is a flowchart of another exemplary process for providing burst transfers over a communication interface, according to some implementations.

FIG. 6 is a flowchart of an exemplary process 600 for providing burst transfers over a communication interface, in accordance with some exemplary embodiments. For example, one or more die packages, such as integrated circuit package 100, may perform one or more of the operations of exemplary process 500.

Referring to FIG. 6, at block 602, a first read command is received from a first device. The first read command is a request to read a first number of bytes from a second device beginning at a first address. For instance, the first device may be processor 106, and the second device may be first SPI device 130. At block 604, a chip select signal to the second device is asserted. In addition, the first number of bytes are read from the second device beginning at the first address and ending at a second address. The second address may be an address of a last data byte to be read out, for instance.

For instance, the SPI controller 110 may provide a READ command 462, followed by a number of address bytes 464 mapped to an address specified by the first data transfer request, and a number of fields of dummy data 466 over the I/O lines 206 of the SPI communication bus 121. Following the dummy data 466, a first burst of data 468 is clocked out and received over the I/O lines 206.

Further, at block 606, the first number of bytes are transmitted to the first device. For instance, the SPI controller 110 may transmit the first number of bytes received from the first SPI device 130 to the processor 106 over the communication bus 161, which, as described herein, may be an AHB or AXI bus. At block 608, a second read command is received from the first device. The second read command is a request to read a second number of bytes from the second device beginning at a third address.

At block 610, a determination is made as to whether the third address continually follows from the second address. For instance, as described herein, SPI controller 110 may determine whether the third address is equal to the second address plus a predetermined amount (e.g., one, two, four, eight, etc.), where the predetermined amount defines a difference of consecutive addresses. If a determination is made that the third address continually follows from the second address, at block 612, the method proceeds to block 614. Further, at block 614, the chip select signal remains asserted, and the second number of bytes are read from the second device. For instance, the SPI controller 110 may clock out a second burst of data over the I/O lines 206 of the SPI communication bus 121. From block 614, the method proceeds to block 620, where the second number of bytes are transmitted to the first device.

If at block 612, however, a determination is made that the third address does not continually follow from the second address, the method proceeds to block 616, where the chip select signal to the second device is de-asserted. From block 616, the method proceeds to block 618, where the chip select signal is reasserted and, further, the second number of bytes are read from the second device. From block 618, the method proceeds to block 620, where the second number of bytes are transmitted to the first device.

Implementation examples are further described in the following numbered clauses:

1. A device comprising:
   a first communication bus;
   a second communication bus; and controller logic electrically coupled to the first communication bus and the second communication bus, the controller logic configured to:
      receive a first data transfer request over the first communication bus;
      determine a final address based on the first data transfer request;
      assert a chip select signal of the second communication bus in response to the first data transfer request; and
      while asserting the chip select signal:
         initiate a first data exchange over the second communication bus;
         receive a second data transfer request over the first communication bus;
         determine an initial address based on the second data transfer request;
         determine to continue to assert the chip select signal based on the initial address and the final address; and
         initiate a second data exchange over the second communication bus while the chip select signal is asserted.

2. The device of clause 1, wherein the controller logic is configured to:
   compare the initial address to the final address;
   determine that the initial address continuously follows from the final address based on the comparison; and
   determine to continue to assert the chip select signal based on determining that the initial address continuously follows from the final address.

3. The device of clause 2, wherein the controller logic is configured to determine that the initial address is greater than the final address by a predetermined value.

4. The device of clause 3, wherein the predetermined value is one.
5. The device of any of clauses 1-4 comprising a register, wherein the controller logic is configured to:
store the final address in the register; and
while asserting the chip select signal, read the final address from the register.
6. The device of any of clauses 1-5 comprising a timer, wherein the controller logic is configured to:
write a value to the timer characterizing an interval of time;
start the timer based on receiving the first data transfer request; and
reset the timer based on receiving the second data transfer.
7. The device of clause 6, wherein the controller logic is configured to:
detect that the timer expired; and
de-assert the chip select signal in response to detecting the timer expiring.
8. The device of any of clauses 1-7 wherein the first data exchange over the second communication bus comprises a command, an address, and a first set of data, and the second data exchange over the second communication bus comprises a second set of data.
9. The device of any of clauses 1-8, wherein the second communication bus is a serial peripheral interface bus.
10. The device of any of clauses 1-9, wherein the first communication bus is an advanced high performance bus.
11. A method by a processor comprising:
receiving a first data transfer request over a first communication bus;
determining a final address based on the first data transfer request;
asserting a chip select signal of a second communication bus in response to the first data transfer request;
while asserting the chip select signal:
initiating a first data exchange over the second communication bus;
receiving a second data transfer request over the first communication bus;
determining an initial address based on the second data transfer request;
continuing to assert the chip select signal based on the initial address and the final address; and
initiating a second data exchange over the second communication bus while the chip select signal is asserted.
12. The method of clause 11, further comprising:
comparing the initial address to the final address;
determining that the initial address continuously follows from the final address based on the comparison; and
continuing to assert the chip select signal based on determining that the initial address continuously follows from the final address.
13. The method of clause 12, further comprising determining that the initial address is greater than the final address by a predetermined value.
14. The method of any of clauses 11-13, wherein the predetermined value is one.
15. The method of any of clause 11-14, further comprising:
storing the final address in a register; and
while asserting the chip select signal, reading the final address from the register.
16. The method of any of clauses 11-15, further comprising:
writing a value to a timer characterizing an interval of time;
starting the timer based on receiving the first data transfer request; and resetting the timer based on receiving the second data transfer.
17. The method of clause 16, further comprising:
detecting that the timer expired; and
de-asserting the chip select signal in response to detecting the timer expiring.
18. The method of any of clauses 11-17, wherein the first data exchange over the second communication bus comprises a command, an address, and a first set of data, and the second data exchange over the second communication bus comprises a second set of data.
19. The method of any of clauses 11-18, wherein the second communication bus is a serial peripheral interface bus.
20. The method of any of clauses 11-19, wherein the first communication bus is an advanced high performance bus.
21. A non-transitory, machine-readable storage medium comprises instructions that, when executed by at least one processor, cause the at least one processor to:
receive a first data transfer request over a first communication bus;
determine a final address based on the first data transfer request;
assert a chip select signal of a second communication bus in response to the first data transfer request; and
while asserting the chip select signal:
initiate a first data exchange over the second communication bus;
receive a second data transfer request over the first communication bus;
determine an initial address based on the second data transfer request;
determine to continue to assert the chip select signal based on the initial address and the final address; and
initiate a second data exchange over the second communication bus while the chip select signal is asserted.
22. The non-transitory, machine-readable storage medium of clause 21, wherein the instructions, when executed by the at least one processor, cause the at least one processor to:
compare the initial address to the final address;
determine that the initial address continuously follows from the final address based on the comparison; and
continue to assert the chip select signal based on determining that the initial address continuously follows from the final address.
23. The non-transitory, machine-readable storage medium of clause 22, wherein the instructions, when executed by the at least one processor, cause the at least one processor to determine that the initial address is greater than the final address by a predetermined value.
24. The non-transitory, machine-readable storage medium of any of clauses 21-23, wherein the predetermined value is one.
25. The non-transitory, machine-readable storage medium of any of clauses 21-24, wherein the instructions, when executed by the at least one processor, cause the at least one processor to:
store the final address in a register; and while asserting the chip select signal, read the final address from the register.

26. The non-transitory, machine-readable storage medium of any of clauses 21-25, wherein the instructions, when executed by the at least one processor, cause the at least one processor to:
    write a value to a timer characterizing an interval of time;
    start the timer based on receiving the first data transfer request; and
    reset the timer based on receiving the second data transfer.

27. The non-transitory, machine-readable storage medium of clause 26, wherein the instructions, when executed by the at least one processor, cause the at least one processor to:
    detect that the timer expired; and
    de-assert the chip select signal in response to detecting the timer expiring.

28. The non-transitory, machine-readable storage medium of any of clauses 21-27, wherein the first data exchange over the second communication bus comprises a command, an address, and a first set of data, and the second data exchange over the second communication bus comprises a second set of data.

29. The non-transitory, machine-readable storage medium of any of clauses 21-28, wherein the second communication bus is a serial peripheral interface bus.

30. The non-transitory, machine-readable storage medium of any of clauses 21-29, wherein the first communication bus is an advanced high performance bus.

31. A die package comprising:
    a processor; and
    controller logic electrically coupled to the processor over a first communication bus, the controller logic configured to:
        receive a first data transfer request from the processor over the first communication bus;
        determine a final address based on the first data transfer request;
        assert a chip select signal of a second communication bus in response to the first data transfer request; and
        while asserting the chip select signal:
            initiate a first data exchange over the second communication bus;
            receive a second data transfer request from the processor over the first communication bus;
            determine an initial address based on the second data transfer request;
            determine to continue to assert the chip select signal based on the initial address and the final address; and
            initiate a second data exchange over the second communication bus while the chip select signal is asserted.

32. The die package of clause 31, wherein the controller logic is configured to:
    compare the initial address to the final address;
    determine that the initial address continuously follows from the final address based on the comparison; and
    determine to continue to assert the chip select signal based on determining that the initial address continuously follows from the final address.

33. The die package of clause 32, wherein the controller logic is configured to determine that the initial address is greater than the final address by a predetermined value.

34. The die package of clause 33, wherein the predetermined value is one.

35. The die package of any of clauses 31-34 comprising a register, wherein the controller logic is configured to:
    store the final address in the register; and
    while asserting the chip select signal, read the final address from the register.

36. The die package of any of clauses 31-35 comprising a timer, wherein the controller logic is configured to:
    write a value to the timer characterizing an interval of time;
    start the timer based on receiving the first data transfer request; and
    reset the timer based on receiving the second data transfer.

37. The die package of clause 36, wherein the controller logic is configured to:
    detect that the timer expired; and
    de-assert the chip select signal in response to detecting the timer expiring.

38. The die package of any of clauses 31-37 wherein the first data exchange over the second communication bus comprises a command, an address, and a first set of data, and the second data exchange over the second communication bus comprises a second set of data.

39. The die package of any of clauses 31-38, wherein the second communication bus is a serial peripheral interface bus.

40. The die package of any of clauses 31-39, wherein the first communication bus is an advanced high performance bus.

Although the methods described above are with reference to the illustrated flowcharts, many other ways of performing the acts associated with the methods may be used. For example, the order of some operations may be changed, and some embodiments may omit one or more of the operations described and/or include additional operations.

In addition, the methods and system described herein may be at least partially embodied in the form of computer-implemented processes and apparatus for practicing those processes. The disclosed methods may also be at least partially embodied in the form of tangible, non-transitory machine-readable storage media encoded with computer program code that, when executed, causes a machine to fabricate at least one integrated circuit that performs one or more of the operations described herein. For example, the methods may be embodied in hardware, in executable instructions executed by a processor (e.g., software), or a combination of the two. The media may include, for example, RAMs, ROMs, CD-ROMs, DVD-ROMs, BD-ROMs, hard disk drives, flash memories, or any other non-transitory machine-readable storage medium. When the computer program code is loaded into and executed by a computer, the computer becomes an apparatus for causing a machine to fabricate the integrated circuit. The methods may also be at least partially embodied in the form of a computer into which computer program code is loaded or executed, such that, the computer becomes a special purpose computer for causing a machine to fabricate the integrated circuit. For instance, when implemented on a general-purpose processor, computer program code segments can configure the processor to create specific logic circuits. The methods may alternatively be at least partially embodied in application specific integrated circuits or any other integrated circuits for performing the methods.

In addition, terms such as "circuit," "circuitry," "logic," and the like can include, alone or in combination, analog circuitry, digital circuitry, hardwired circuitry, programmable circuitry, processing circuitry, hardware logic circuitry, state machine circuitry, and any other suitable type of physical hardware components. Further, the embodiments described herein may be employed within various types of devices such as networking devices, telecommunication devices, smartphone devices, gaming devices, enterprise devices, storage devices (e.g., cloud storage devices), automobile systems (e.g., collision avoidance systems, object detection systems, navigation systems, etc.), and computing devices (e.g., cloud computing devices), among other types of devices.

The subject matter has been described in terms of exemplary embodiments. Because they are only examples, the claimed inventions are not limited to these embodiments. Changes and modifications may be made without departing the spirit of the claimed subject matter. It is intended that the claims cover such changes and modifications.

We claim:

1. A device comprising:
   a first communication bus;
   a second communication bus; and
   controller logic electrically coupled to the first communication bus and the second communication bus, the controller logic configured to:
   receive a first data transfer request over the first communication bus;
   determine a final address based on the first data transfer request;
   assert a chip select signal of the second communication bus in response to the first data transfer request; and
   while asserting the chip select signal:
   initiate a first data exchange over the second communication bus;
   receive a second data transfer request over the first communication bus;
   determine an initial address based on the second data transfer request;
   determine to continue to assert the chip select signal based on the initial address and the final address; and
   initiate a second data exchange over the second communication bus while the chip select signal is asserted.

2. The device of claim 1, wherein the controller logic is configured to:
   compare the initial address to the final address;
   determine that the initial address continuously follows from the final address based on the comparison; and
   determine to continue to assert the chip select signal based on determining that the initial address continuously follows from the final address.

3. The device of claim 2, wherein the controller logic is configured to determine that the initial address is greater than the final address by a predetermined value.

4. The device of claim 3, wherein the predetermined value is one.

5. The device of claim 1 comprising a register, wherein the controller logic is configured to:
   store the final address in the register; and
   while asserting the chip select signal, read the final address from the register.

6. The device of claim 1 comprising a timer, wherein the controller logic is configured to:
   write a value to the timer characterizing an interval of time;
   start the timer based on receiving the first data transfer request; and
   reset the timer based on receiving the second data transfer.

7. The device of claim 6, wherein the controller logic is configured to:
   detect that the timer expired; and
   de-assert the chip select signal in response to detecting the timer expiring.

8. The device of claim 1 wherein the first data exchange over the second communication bus comprises a command, an address, and a first set of data, and the second data exchange over the second communication bus comprises a second set of data.

9. The device of claim 1, wherein the second communication bus is a serial peripheral interface bus.

10. The device of claim 1, wherein the first communication bus is an advanced high performance bus.

11. A method by a processor comprising:
    receiving a first data transfer request over a first communication bus;
    determining a final address based on the first data transfer request;
    asserting a chip select signal of a second communication bus in response to the first data transfer request;
    while asserting the chip select signal:
    initiating a first data exchange over the second communication bus;
    receiving a second data transfer request over the first communication bus;
    determining an initial address based on the second data transfer request;
    determining to continue to assert the chip select signal based on the initial address and the final address; and
    initiating a second data exchange over the second communication bus while the chip select signal is asserted.

12. The method of claim 11, further comprising:
    comparing the initial address to the final address;
    determining that the initial address continuously follows from the final address based on the comparison; and
    continuing to assert the chip select signal based on determining that the initial address continuously follows from the final address.

13. The method of claim 12, further comprising determining that the initial address is greater than the final address by a predetermined value.

14. The method of claim 11, further comprising:
    storing the final address in a register; and
    while asserting the chip select signal, reading the final address from the register.

15. The method of claim 11, further comprising:
    writing a value to a timer characterizing an interval of time;
    starting the timer based on receiving the first data transfer request; and
    resetting the timer based on receiving the second data transfer.

16. The method of claim 15, further comprising:
    detecting that the timer expired; and
    de-asserting the chip select signal in response to detecting the timer expiring.

17. The method of claim 11, wherein the first data exchange over the second communication bus comprises a command, an address, and a first set of data, and the second data exchange over the second communication bus comprises a second set of data.

18. The method of claim 11, wherein the second communication bus is a serial peripheral interface bus.

19. A non-transitory, machine-readable storage medium comprises instructions that, when executed by at least one processor, cause the at least one processor to:
    receive a first data transfer request over a first communication bus;
    determine a final address based on the first data transfer request;
    assert a chip select signal of a second communication bus in response to the first data transfer request; and
    while asserting the chip select signal:
        initiate a first data exchange over the second communication bus;
        receive a second data transfer request over the first communication bus;
        determine an initial address based on the second data transfer request;
        determine to continue to assert the chip select signal based on the initial address and the final address; and
        initiate a second data exchange over the second communication bus while the chip select signal is asserted.

20. A die package, comprising:
a processor; and
controller logic electrically coupled to the processor over a first communication bus, the controller logic configured to:
    receive a first data transfer request from the processor over the first communication bus;
    determine a final address based on the first data transfer request;
    assert a chip select signal of a second communication bus in response to the first data transfer request; and
    while asserting the chip select signal:
        initiate a first data exchange over the second communication bus;
        receive a second data transfer request from the processor over the first communication bus;
        determine an initial address based on the second data transfer request;
        determine to continue to assert the chip select signal based on the initial address and the final address; and
        initiate a second data exchange over the second communication bus while the chip select signal is asserted.

* * * * *